United States Patent
Tsuji et al.

(10) Patent No.: US 9,256,793 B2
(45) Date of Patent: Feb. 9, 2016

(54) APPARATUS AND METHOD FOR EXTRACTING OBJECT IMAGE

(75) Inventors: Kentarou Tsuji, Kawasaki (JP); Eigo Segawa, Kawasaki (JP); Morito Shiohara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 861 days.

(21) Appl. No.: 12/550,591

(22) Filed: Aug. 31, 2009

(65) Prior Publication Data

US 2010/0060732 A1 Mar. 11, 2010

(30) Foreign Application Priority Data

Sep. 5, 2008 (JP) .................. 2008-228985

(51) Int. Cl.
- H04N 7/18 (2006.01)
- G06K 9/20 (2006.01)
- G06K 9/34 (2006.01)

(52) U.S. Cl.
CPC ............. G06K 9/2036 (2013.01); G06K 9/20 (2013.01); G06K 9/2027 (2013.01); G06K 9/34 (2013.01)

(58) Field of Classification Search
CPC ......... G06K 9/20; G06K 9/2027; G06K 9/34; G06K 9/2036
USPC ........................................ 348/143, 152, 153
See application file for complete search history.

(56) References Cited

U.S. PATENT DOCUMENTS

| | | | |
|---|---|---|---|
| 6,441,865 B1 | 8/2002 | Hailey | |
| 6,445,409 B1 * | 9/2002 | Ito et al. | 348/155 |
| 6,490,006 B1 * | 12/2002 | Monjo | 348/587 |
| 6,766,054 B1 * | 7/2004 | Christensen et al. | 382/173 |
| 7,263,217 B2 | 8/2007 | Kawaike et al. | |
| 2003/0075675 A1 | 4/2003 | Braune et al. | |
| 2004/0156557 A1 | 8/2004 | Van Der Weij | |

FOREIGN PATENT DOCUMENTS

| | | |
|---|---|---|
| CA | 2 386 250 | 1/2001 |
| JP | 11-32325 | 2/1999 |
| JP | 2000-341679 | 12/2000 |

(Continued)

OTHER PUBLICATIONS

M. Hayasaka, et al., "Multiple Object Tracking Using Back Projection Method and Kalman Filter,", IEICE Technical Report, PRMU 2001-132, pp. 133-138, Nov. 2001.

(Continued)

*Primary Examiner* — Daniel C Murray
*Assistant Examiner* — Adam Cooney
(74) *Attorney, Agent, or Firm* — Staas & Halsey LLP

(57) ABSTRACT

An apparatus for extracting image data of an object in an input image data. The apparatus includes a display device having a display screen for displaying a plurality of predetermined images; a display controller for controlling the display device to display one of the predetermined images; an imaging device for taking an image of an object placed before the display screen in order to generate an input image data; a controller for controlling the imaging device to take an image of the object and the display screen when the display device displays one of the predetermined images in cooperation with the display controller; and an extractor for extracting image data of the object by comparing the input image data generated by imaging device with data of the one of the plurality of the predetermined images.

21 Claims, 13 Drawing Sheets

(56) References Cited

FOREIGN PATENT DOCUMENTS

| | | |
|---|---|---|
| JP | 2003-151048 | 5/2003 |
| JP | 2003-269915 | 9/2003 |
| JP | 2006-209728 | 8/2006 |
| JP | 2006-305039 | 11/2006 |
| WO | 01/06766 A1 | 1/2001 |

OTHER PUBLICATIONS

Alper Yilmaz et al. "Object Tracking: A Survey" AMC Computing Surveys, vol. 38, No. 4, Dec. 25, 2006, pp. 1-45.

Sergio Velastin et al. "Intelligent distributed video surveillance systems" IEE computing series vol. 5, The institution of Electrical Engineers, Jan. 1, 2006 pp. 5-6.

Extended European Search Report issued Jul. 30, 2014 in corresponding European Patent Application No. 09169128.7.

Extended European Search Report dated Jul. 27, 2015 in corresponding European Patent Application No. 09169128.7, 7 pages.

European Office Action dated Jul. 27, 2015 in corresponding European Patent Application No. 09169128.7, 7 pages.

\* cited by examiner

| SET COLOR | SET PATTERN | DISPLAY CONTROL SIGNAL |
|---|---|---|
| RED | PATTERN A | 001A |
| RED | PATTERN B | 001B |
| RED | PATTERN C | 001C |
| BLUE | PATTERN A | 002A |
| BLUE | PATTERN B | 002B |
| ⋮ | ⋮ | ⋮ |

| SET COLOR | SET PATTERN | ⋯ | BACKGROUND IMAGE FILE |
|---|---|---|---|
| RED | PATTERN A | ⋯ | red_001.bmp |
| RED | PATTERN B | ⋯ | red_002.bmp |
| BLUE | PATTERN A | ⋯ | blue_001.bmp |
| BLUE | PATTERN B | ⋯ | blue_002.bmp |
| BLUE | PATTERN C | ⋯ | blue_003.bmp |
| ⋮ | ⋮ | ⋮ | ⋮ |

| SET COLOR | SET PATTERN | TIME | ... | IMAGE FILE |
|---|---|---|---|---|
| RED | PATTERN A | 00:00:00 | ... | 000001.bmp |
| YELLOW | PATTERN B | 00:00:01 | ... | 000002.bmp |
| BLUE | PATTERN A | 00:00:02 | ... | 000003.bmp |
| GREEN | PATTERN B | 00:00:03 | ... | 000004.bmp |
| WHITE | PATTERN C | 00:00:04 | ... | 000005.bmp |
| ... | | ... | ... | ... |

| | SET COLOR OF INPUT IMAGES IN DISPLAY APPARATUS | | | | | |
|---|---|---|---|---|---|---|
| SET COLOR OF PAST IMAGES IN DISPLAY APPARATUS | | RED | BLUE | YELLOW | ... | WHITE | BLACK |
| | RED | | 50 | 100 | | 180 | 75 |
| | BLUE | 50 | | 150 | | 230 | 25 |
| | YELLOW | 100 | 150 | | | 80 | 175 |
| | ... | | | | | | |
| | WHITE | 180 | 230 | 80 | | | 255 |
| | BLACK | 75 | 25 | 175 | | 255 | |

25

| OBJECT CONFIGURATION | | NUMBER OF DISPLAY SURFACE TO BE CHANGED IN COLOR |
|---|---|---|
| X-COORDINATE | Y-COORDINATE | NUMBER |
| 0 TO 20 | 0 TO 20 | 11 |
| 20 TO 40 | 0 TO 20 | 12 |
| 40 TO 60 | 0 TO 20 | 13 |
| ... | ... | ... |
| 140 TO 160 | 80 TO 100 | 57 |
| 160 TO 180 | 80 TO 100 | 58 |
| 180 TO 200 | 80 TO 100 | 59 |

APPARATUS AND METHOD FOR EXTRACTING OBJECT IMAGE

CROSS-REFERENCE TO RELATED APPLICATION

This application is based upon and claims the benefit of priority of the prior Japanese Patent Application No. 2008-228985, filed on Sep. 5, 2008, the entire contents of which are incorporated herein by reference.

FIELD

The embodiments discussed herein are related to an apparatus and a method for extracting an object in an image data.

BACKGROUND

In recent years, from the security viewpoint, it is becoming important to use a surveillance camera to perform surveillance in order to discover a suspicious person and/or a suspicious substance, for example. In order to reduce the load on a watchman who watches the video photographed by a surveillance camera, various systems have been disclosed in which a computer may be used to image-process the video by the camera to discover a suspicious person and/or a suspicious substance.

For example, a technology has been disclosed which extracts an object by comparing a photographed image and a pre-photographed past background image as discussed in Japanese Laid-open Patent Publication No. 11-32325, and another technology has been disclosed which irradiates pattern light, compares an image with an object and an image without it and extracts the object on the basis of the difference in pattern as discussed in Japanese Laid-open Patent Publication No. 2003-269915.

However, both of the conventional technologies have a problem that an object may not be extracted with high accuracy. FIG. 17 is a diagram for describing an example that the color of the object to be extracted and the background color are similar. FIG. 17 is a plan view illustrating objects 83 to 85 and a background 82. The object 83 includes parts 83a and 83b, the object 84 includes parts 84a and 84b, and the object 85 includes parts 85a and 85b. The objects 83, 84 and 85 have different colors. More specifically, according to Patent Document 1, as illustrated in FIG. 17, when the color of the entire object is much similar to the background color, the object may not be extracted. For example, in FIG. 17, it is difficult to extract the object 84 in the lower part of the diagram.

According to Patent Document 2, due to the effect of the shade of the pattern light, the object may not be extracted clearly. Furthermore, according to Patent Document 2, because the shaded object may not be extracted, the extraction of plural objects is not supported.

SUMMARY

According to an aspect of the invention, an apparatus for extracting image data of an object in an input image data includes a display device having a display screen for displaying a plurality of predetermined images; a display controller for controlling the display device to display one of the predetermined images; an imaging device for taking an image of an object placed before the display screen in order to generate an input image data; a controller for controlling the imaging device to take an image of the object and the display screen when the display device displays one of the predetermined images in cooperation with the display controller; and an extractor for extracting image data of the object by comparing the input image data generated by imaging device with data of the one of the plurality of the predetermined images.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of the information to be stored in a display control signal storage portion;

FIG. 4 is a diagram illustrating an example of the information to be stored in a background image storage unit;

FIG. 7 is a diagram illustrating an example of the information to be stored in a past image storage portion;

FIG. 8 is a diagram illustrating an example of the information to be stored in a threshold value setting storage portion;

FIG. 17 is a diagram for describing an example that the color of the object to be extracted and the background color are similar.

DESCRIPTION OF EMBODIMENTS

With reference to attached drawings, embodiments of the object extracting apparatus, object extracting method and object extracting program according to the present invention will be described in detail below.

Embodiment 1

[Outline of Object Extracting Apparatus]

Figure 1A:
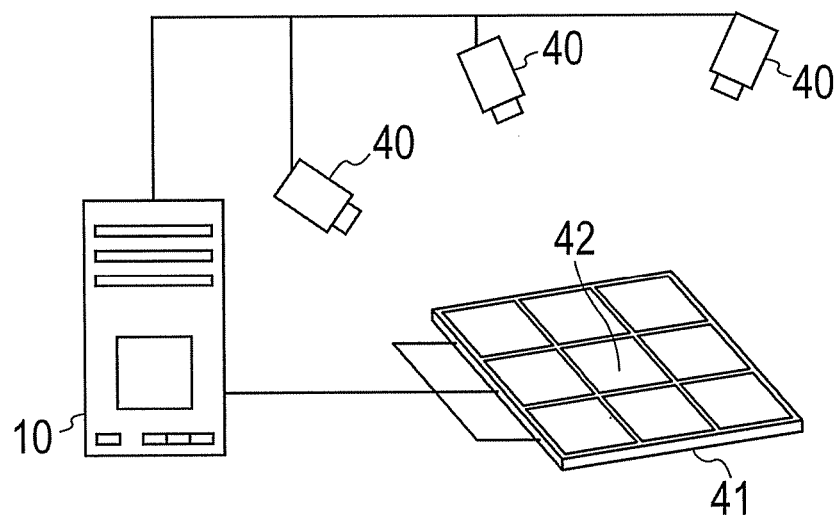
FIG. 1A is a diagram illustrating the outline of the apparatus according to Embodiment 1.
Figure 1B:
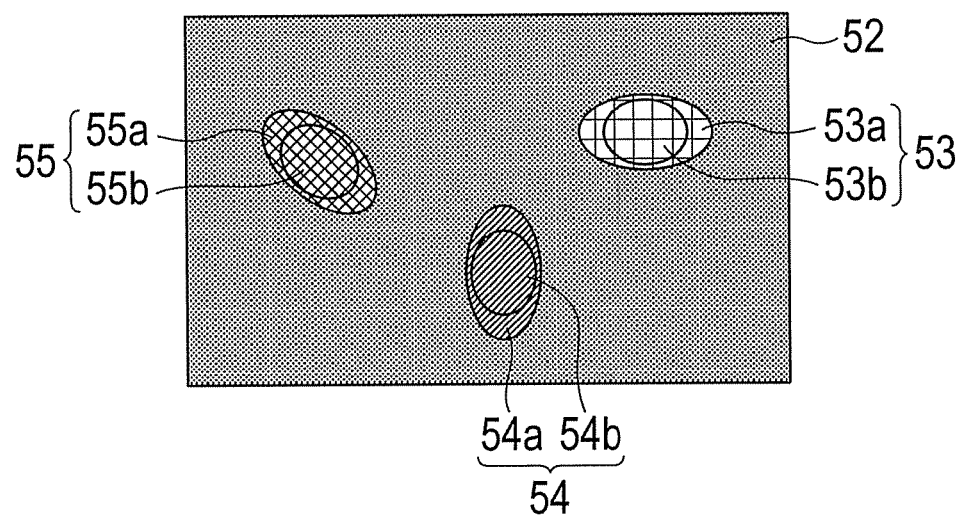
FIG. 1B is a diagram for describing the object extraction according to Embodiment 1.

First of all, with reference to FIG. 1A and FIG. 1B, the outline of the object extracting apparatus according to Embodiment 1 will be described. FIG. 1A is a diagram illustrating the outline of the object extracting apparatus according to Embodiment 1, and FIG. 1B is a diagram for describing the object extraction according to Embodiment 1.

An object extracting apparatus 10 disclosed in the subject application is connected to at least one imaging device 40, which is, for example, a surveillance camera that performs surveillance and photographs video within a surveillance range, and at least one display device 41, which performs display and output by changing the color and/or pattern to be displayed on the basis of the control signal, as illustrated in FIG. 1A. The imaging device 40 is directed toward the display device 41 and photographs an object present between the display device 41 and the imaging device 40.

Then, the display device 41 has a display screen 42, e.g. a liquid crystal screen or an LED (Light Emitting Diode) luminescent screen, and may be disposed not only on the floor but also on any places such as the wall and ceiling in accordance with the application. Notably, the case where the display device 41 is disposed on the floor and the imaging device 40 is disposed on the ceiling will be described below.

In the configuration as described above, the object extracting apparatus 10 instructs the display device 41, which performs display and output by changing the image, to perform display and output. Then, the object extracting apparatus 10 instructs the imaging device 40 to photograph in timing when the display device 41 is instructed and performs the display and output of an image. Next, the object extracting apparatus 10 compares the input image photographed by the imaging device 40 and a comparison target image to be compared and outputs the comparison result.

More specifically, the object extracting apparatus 10 instructs the display device 41 having a liquid crystal display or an LED luminescent panel to perform display and output by changing the image having the color and/or pattern. Notably, the luminous pattern may be predefined in the object extracting apparatus 10 or may be displayed and be output at random. Alternatively, an image may be input from an external device connecting to the object extracting apparatus 10.

The object extracting apparatus 10 has a lens and instructs the imaging device 40, which photographs with the camera, to photograph in timing when the display device 41 displays and outputs an image in accordance with the instruction by the object extracting apparatus 10. In other words, the display and output of an image by the display device 41 and the photographing by the imaging device 40 are performed in synchronization.

Next, the object extracting apparatus 10 calculates the difference between the pixel values at the same position on the two images of the input image photographed and input by the imaging device 40 and the pre-photographed background image, which is a comparison target. If the calculated difference is equal to or higher than a predetermined value, the object extracting apparatus 10 determines and outputs that some object exists. If the calculated difference is lower than the predetermined value, the object extracting apparatus 10 determines and outputs no objects exist. After that, the object extracting apparatus 10 repeats the processing so as to extract the object.

Notably, the expression "pre-photographed background image" refers to an image photographed at the state without objects and human figures. The pixel value to be calculated may be any value indicating a characteristic of a pixel, such as a luminance value that indicates the degree of brightness of a pixel, a shade value that indicates the depth of the color of a pixel and a combination of the luminance value and the shade value. If the difference in pixel value is equal to or higher than a predetermined value, it may be determined that some object exists in the pixel part.

In other words, the object extracting apparatus 10 can synchronize the display device 41 that perform display and output by changing the image and the imaging device 40 that photographs and instruct the imaging device 40 to photograph in timing when the display device 41 performs display and output, compare the photographed input image and a pre-photographed background image and output the comparison result. As a result, the object can be extracted with high accuracy. FIG. 1B is a plan view illustrating an input image 51 of objects 53 to 55 and a display surface 52 of the display screen 42. The input image 51 is obtained by the imaging device 40. The display surface 52 is the surface of the display screen 42. The object 53 includes parts 53a and 53b, the object 54 includes parts 54a and 54b, and the object 55 includes parts 55a and 55b. The objects 53, 54 and 55 have pixels of different colors, luminance values and shade values. An object can be extracted with high accuracy by causing the display surface 52 to emit light such that the pixel value to be output on the display surface 52 and the pixel values of the objects 53 to 55 can differ largely when imaged.

Configuration of Object Extracting Apparatus According to Embodiment 1

Figure 2:
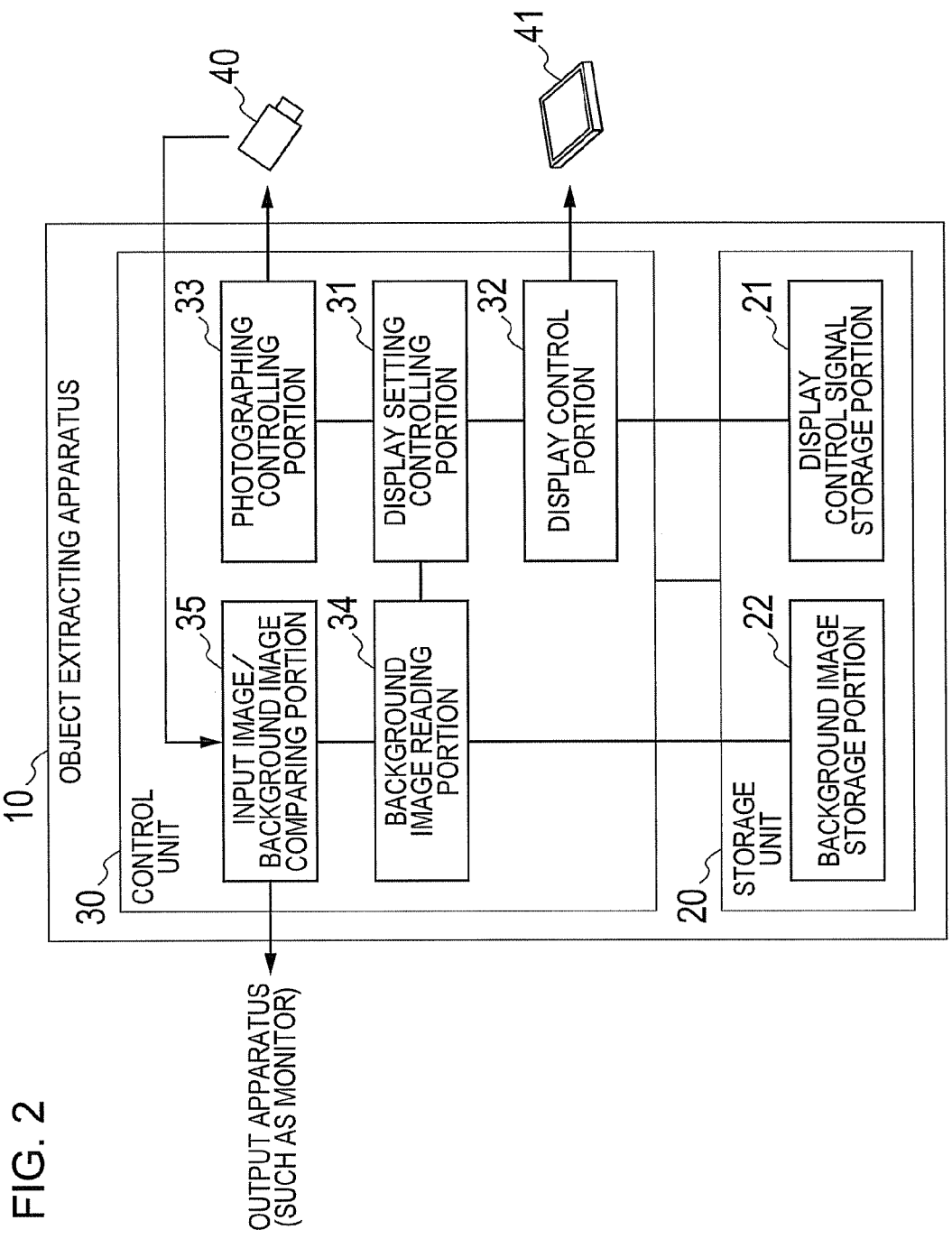
FIG. 2 is a diagram illustrating a configuration example of the object extracting apparatus according to Embodiment 1.

Next, with reference to FIGS. 2 to 4, the configuration of the object extracting apparatus 10 according to Embodiment 1 will be described. FIG. 2 is a diagram illustrating a configuration example of the object extracting apparatus 10 according to Embodiment 1.

As illustrated in FIG. 2, the object extracting apparatus 10 includes a storage unit 20 and a control unit 30 and is connected to at least one imaging device 40, which is, for example, a surveillance camera that performs surveillance and photographs a video within a surveillance range, and at least one display device 41 that performs display and output by changing the color and/or pattern to be displayed in accordance with the control signal.

The storage unit 20 stores data used by the processing by the control unit 30 and processing results by the control unit 30 and particularly has a display control signal storage portion 21 and a background image storage portion 22.

The display control signal storage portion 21 stores a control signal for causing the display device 41 to perform display and output in association with the color and pattern of a image. FIG. 3 is a diagram illustrating an example of the information to be stored in the display control signal storage portion 21. More specifically, the display control signal storage portion 21 stores, as illustrated in FIG. 3, a "display control signal" in association with the "set color" and "set pattern" of the image to be displayed and be output by the display device 41. For example, the display control signal storage portion 21 stores a display control signal "001A" in association with the set color "red" and the set pattern "pattern A", as illustrated in FIG. 3.

The background image storage portion 22 stores a background image being a pre-photographed image in association with the color and pattern of a image. FIG. 4 is a diagram illustrating an example of the information to be stored in the background image storage portion 22. More specifically, the background image storage portion 22 stores, as illustrated in FIG. 4, a "background image file" in association with the "set color" and "set pattern" of the image displayed and output by the display device 41.

For example, the background image storage portion 22 stores a background image file "red_001.bmp" photographed when the set color is "red" and the set pattern is "pattern A" in the display device 41, as illustrated in FIG. 4. Notably, the background image refers to an image photographed at the state without objects and human figures, and the image may have any file format, without limiting to the bmp (Bit MaP) format.

The background image to be stored in the background image storage portion 22 may be an image photographed at the state that a parameter in the display device 41 is set or may be an image created by calculating the scene in a changed color to be output by the display device 41 from information on the position and attitude of the camera and the illustrated background, for example.

The control unit 30 has an internal memory for storing a control program, programs defining processing routines and necessary data and particularly has a display setting controlling portion 31, a display control portion 32, a photographing controlling portion 33, a background image reading portion 34 and an input image/background image comparing portion 35 (an extractor), whereby various processes are implemented.

The display setting controlling portion 31 instructs the display and output by the display device 41 that displays and outputs a changed image. In one concrete example, the display setting controlling portion 31 notifies the display control portion 32, which will be described later, of an instruction to change the color "red" and/or pattern "pattern A", for example, to be displayed and output by the display device 41, which has a liquid crystal display or an LED luminescent panel, and the timing for the display and output.

The display setting controlling portion 31 instructs the imaging device 40 to photograph in timing when the display device 41 displays and outputs an image. In one concrete example, the display setting controlling portion 31 notifies the photographing controlling portion 33, which will be described later, of controlling the imaging device 40 to photograph in timing when the display device 41 is caused to display and output an image.

The information such as the color "red" and/or pattern "pattern A" for the display device 41, which is instructed to change by the display setting controlling portion 31, is also notified to the background image reading portion 34, which will be described later. Notably, the color and/or pattern to be changed may be changed properly in predetermined order or may be changed in accordance with the color and/or pattern selected on the basis of the detection result before it or they are changed.

The display control portion 32 acquires the display control signal stored in the display control signal storage portion 21 on the basis of the information on the color and pattern, for example, notified by the display setting controlling portion 31 and notifies the acquired display control signal to the display device 41.

In one concrete example of the example, the display control portion 32 acquires the display control signal "001A" stored in the display control signal storage portion 21 on the basis of the information such as the color "red" and the pattern "pattern A" notified by the display setting controlling portion 31. Then, the display control portion 32 notifies the acquired display control signal "001A" to the display device 41.

The photographing controlling portion 33 controls the imaging device 40 to photograph in accordance with the information on the timing for the display and output of the image on the display device 41, which is notified by the display setting controlling portion 31. In one concrete example of the example, the photographing controlling portion 33 controls the imaging device 40 to photograph in synchronization with the timing for the display and output of the image by the display device 41 (that is, the timing for the change and display and output of the image), which is notified by the display setting controlling portion 31.

In other words, because the display control portion 32 and the photographing controlling portion 33 synchronize the change (and display and output) of an image by the display device and the photographing by the camera, video upon light emission can be photographed even when the light emitting time by the display device 41 is reduced. That is to say, by significantly reducing the time for emitting light by the display device 41, the object extracting apparatus 10 can perform the object extracting processing with perception of no flashing in human vision.

The background image reading portion 34 acquires a background image stored in the background image storage portion 22 on the basis of the information on the color and pattern, for example, notified by the display setting controlling portion 31. In one concrete example of the example, the background image reading portion 34 acquires a background image "red_001.bmp" stored in the background image storage portion 22 on the basis of the information such as the color "red" and the pattern "pattern A" notified by the display setting controlling portion 31.

The input image/background image comparing portion 35 compares the input image photographed by the imaging device 40 and a comparison target image to be compared and outputs the comparison result. In one concrete example of the example, the input image/background image comparing portion 35 calculates the difference between the pixel values at the same position on the two images of the input image photographed and input by the imaging device 40 and the background image, which is a comparison target acquired by the background image reading portion 34.

Then, if the calculated difference in pixel value is equal to or higher than a predetermined value, the input image/background image comparing portion 35 determines that some object exists. If it is lower than the predetermined value, the input image/background image comparing portion 35 determines that no objects exist. Then, the input image/background image comparing portion 35 outputs the comparison result to an output apparatus such as a monitor and/or a system connecting thereto. Notably, the comparison result output by the input image/background image comparing portion 35 may be the presence or absence of an object and/or a human figure (which is binary value information), the form of an object or the size of an object. The pixel value may be calculated not only for each one pixel but also for several pixels together.

After that, the object extracting apparatus 10 repeats the processing and outputs the comparison result of the object extracting processing. In other words, even when the image of the color and/or pattern to be output by the display device 41 and the color and/or pattern of the object are similar, the object can be certainly extracted by repeating the processing in a shorter period of time.

That is to say, even when the color and pattern to be output by the display device 41 are "red" and "pattern A", respectively, and the color of the object has a similar color and pattern thereto, the object extracting apparatus 10 changes the color to be output by the display device 41 (for example, change the color and pattern to be output next by the display device 41 to "blue" and "pattern B") in a much shorter time and can output the comparison result. As a result, the object can be extracted with high accuracy.

Comparison Result Output Processing According to Embodiment 1

Figure 5:
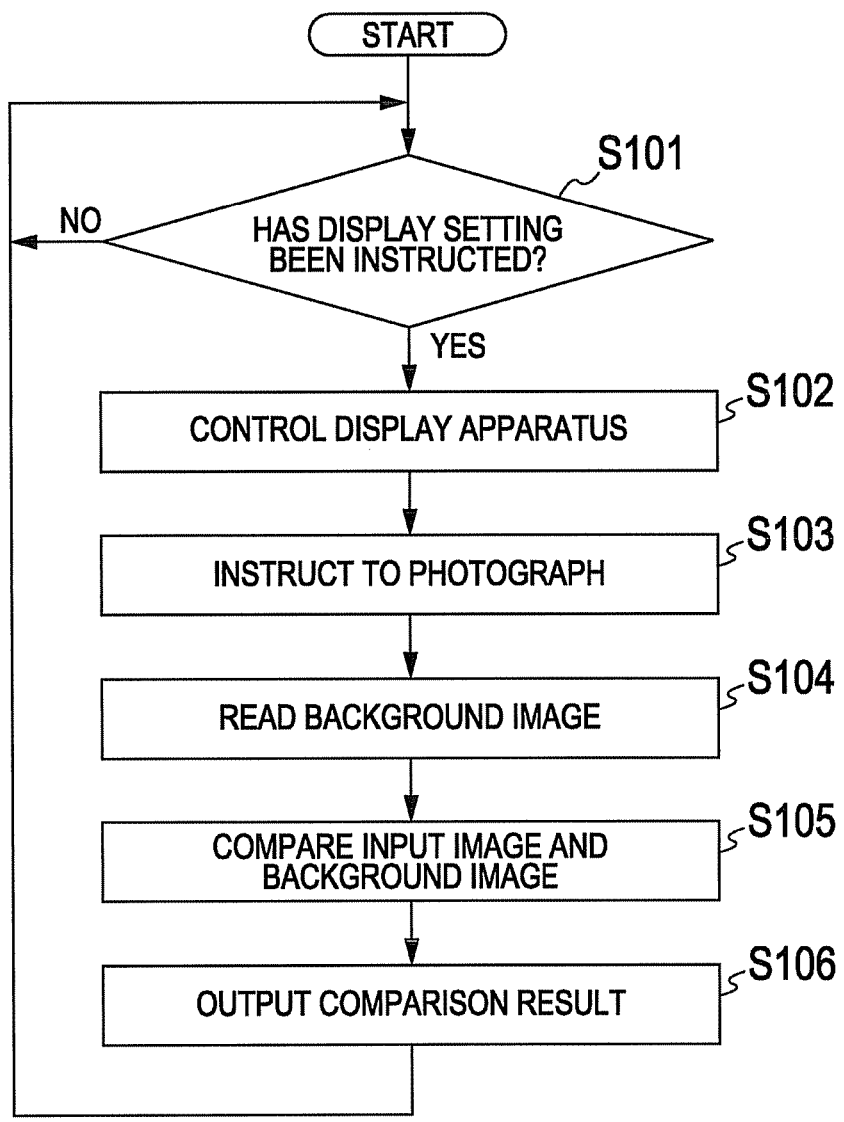
FIG. 5 is a flowchart for describing the flow of the comparison result output processing according to Embodiment 1.

Next, with reference to FIG. 5, the flow of the comparison result output processing according to Embodiment 1 will be described. FIG. 5 is a flowchart for describing the flow of the comparison result output processing according to Embodiment 1.

As illustrated in FIG. 5, for example, the display setting controlling portion 31 notifies the instruction to change the color "red" and pattern "pattern A", for example, to be displayed and output by the display device 41 having a liquid crystal display or an LED luminescent panel and the timing for the display and output to the display control portion 32 (YES in step S101).

The display setting controlling portion 31 notifies that the imaging device 40 is instructed to photograph in timing when the display device 41 is caused to display and output the image to the photographing controlling portion 33. The display setting controlling portion 31 notifies the information such as the color "red" and pattern "pattern A" to be instructed to change in the display device 41 to the background image reading portion 34.

Then, the display control portion 32 acquires the display control signal "001A" stored in the display control signal storage portion 21 on the basis of the information such as the color "red" and pattern "pattern A" notified by the display setting controlling portion 31 and notifies the acquired display control signal "001A" to the display device 41 (step S102).

Next, the photographing controlling portion 33 controls the imaging device 40 to photograph in synchronization with the timing when the display device 41 is caused to display and output the image (which is the timing when the image is changed and is displayed and is output) notified by the display setting controlling portion 31 (step S103).

After that, the background image reading portion 34 acquires the background image "red_001.bmp" stored in the background image storage portion 22 on the basis of the information such as the color "red" and pattern "pattern A" notified by the display setting controlling portion 31 (step S104).

Then, the input image/background image comparing portion 35 calculates the difference between the pixel values at the same position on the two images of the input image photographed and input by the imaging device 40 and the background image, which is a comparison target acquired by the background image reading portion 34. Then, if the calculated difference in pixel value is equal to or higher than a predetermined value, the input image/background image comparing portion 35 determines that some object exists. If it is lower than the predetermined value, the input image/background image comparing portion 35 determines that no objects exist. (step S105).

After that, the input image/background image comparing portion 35 outputs the comparison result to an output apparatus such as a monitor and/or a system connecting thereto (step S106). Notably, the object extracting apparatus 10 repeats the processing in a much shorter time.

Effects of Embodiment 1

As described above, the object extracting apparatus 10 changes the color to be displayed and be output by the display device 41 in a much shorter time, causes the imaging device 40 to photograph in timing when the display device 41 is caused to display and output, compares the pixel values of the photographed input image and pre-photographed background image, which is the comparison target, and outputs the comparison result. Therefore, the object can be extracted with high accuracy.

For example, the object extracting apparatus 10 notifies the instruction to change the color "red" and pattern "pattern A" to be displayed and output by the display device 41 having a liquid crystal display or an LED luminescent panel and the timing for the display and output to the display device 41. The object extracting apparatus 10 notifies that the imaging device 40 is caused to photograph in timing when the display device 41 is caused to display and output the image. Then, the object extracting apparatus 10 calculates the difference between the pixel values at the same position on the two images of the input image photographed and input by the imaging device 40 and the background image, which is a comparison target having the pre-photographed color "red" and pattern "pattern A". After that, if the calculated difference in pixel value is equal to or higher than a predetermined value, the object extracting apparatus 10 determines that some object exists. If it is lower than the predetermined value, the object extracting apparatus 10 determines that no objects exist. Then, the object extracting apparatus 10 outputs the comparison result to an output apparatus such as a monitor and/or a system connecting thereto. Notably, the object extracting apparatus 10 repeats the processing in a much shorter time. As a result, the object extracting apparatus 10 can extract the object with high accuracy.

The object extracting apparatus 10 can synchronize the display and output of an image by the display device 41 and the photographing by the imaging device 40, whereby the photographing can be performed in a shorter light emitting time by the display device 41. As a result, the object extracting processing can be performed with perception of no flashing in human vision. That is to say, the object extracting apparatus 10 can perform the object extracting processing without a suspicious person, for example, being aware of it, and high security can thus be kept.

Because the object extracting apparatus 10 can synchronize the processing by the display device 41 and the imaging device 40 in a much shorter time, the object can be extracted certainly even when the image of the color and/or pattern to be output by the display device 41 and the color and/or pattern of the object are similar.

Embodiment 2

Having described, according to Embodiment 1, the case that the input image photographed by the imaging device 40 and a pre-imaged background image are compared and the comparison result is output, the present invention is not limited thereto. The input image photographed by the imaging device 40 and a past image photographed before the input image may be compared, and the comparison result may be output.

According to Embodiment 2, with reference to FIG. 6 to FIG. 9, the processing by the object extracting apparatus 10 according to Embodiment 2 will be described below. Notably, because the components and partial functions of the object extracting apparatus 10 according to Embodiment 2 are similar to those of Embodiment 1, the description thereon will be omitted herein. Particularly, a past image storage portion 23, a threshold value setting storage portion 24, and an input image/past image comparing portion 36 (an extractor), which are different from Embodiment 1, will be described.

Configuration of Object Extracting Apparatus According to Embodiment 2

Figure 6:
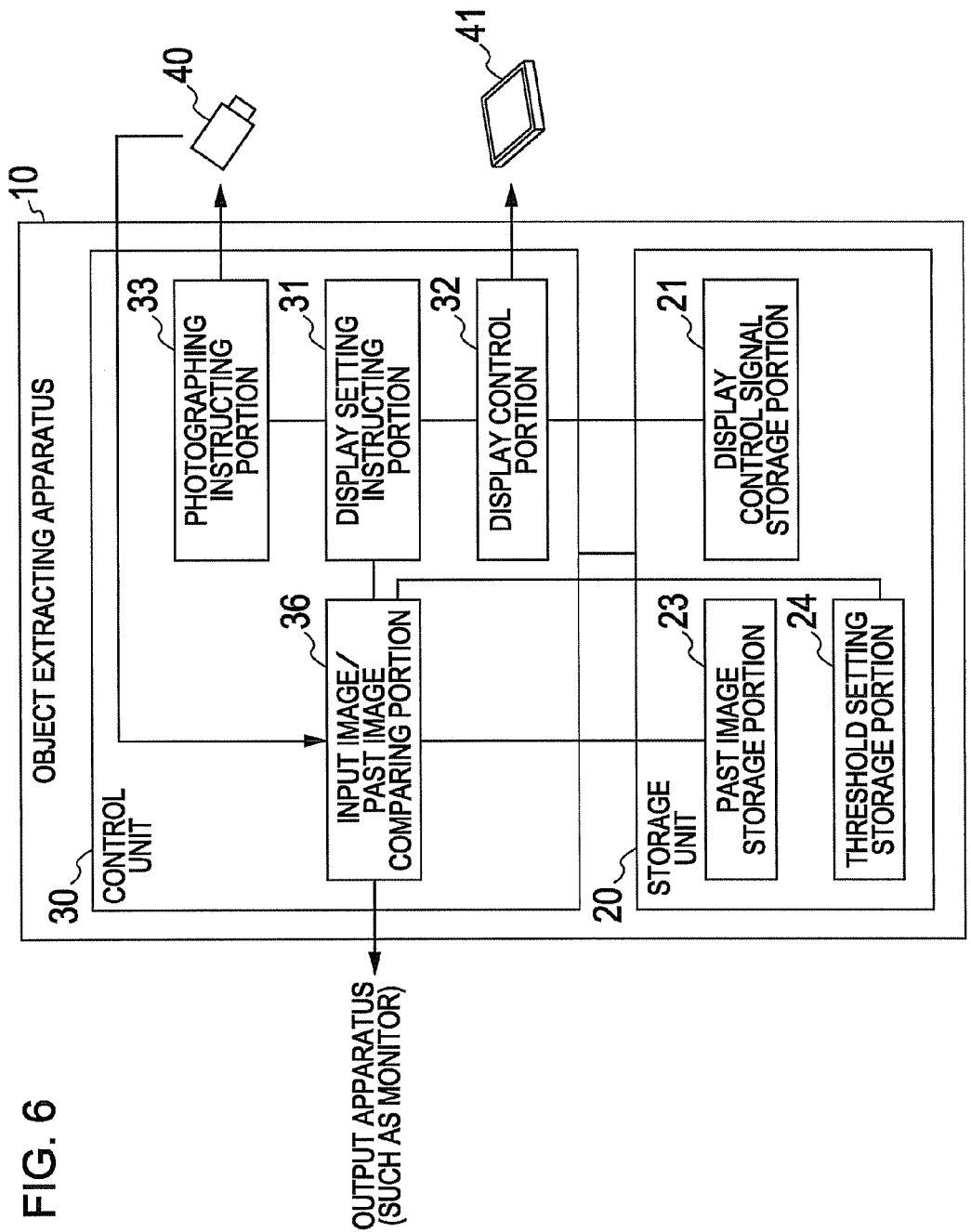
FIG. 6 is a diagram illustrating a configuration example of an object extracting apparatus according to Embodiment 2.

First of all, with reference to FIG. 6, the configuration of the object extracting apparatus 10 according to Embodiment 2 will be described. FIG. 6 is a diagram illustrating a configuration example of the object extracting apparatus 10 according to Embodiment 2.

As illustrated in FIG. 6, the object extracting apparatus 10 includes a storage unit 20 and a control unit 30 and is connected to at least one imaging device 40 that may be, for example, a surveillance camera that performs surveillance and that photographs video within a surveillance range and at least one display device 41 that performs display and output by changing the color and/or pattern to be displayed in accordance with the control signal.

The storage unit 20 stores data used by the processing by the control unit 30 and processing results by the control unit 30 and particularly has a display control signal storage portion 21, a background image storage portion 22, a past image storage portion 23 and a threshold value setting storage portion 24.

The past image storage portion 23 stores a past image representing a photographed image in association with the color and pattern of an image and the photographed time. More specifically, the past image storage portion 23 stores, as illustrated in FIG. 7, a past image "image file" representing an image at the photographed time in association with the "set color" and "set pattern" of the image displayed and output by the display device 41 and the photographed time "time".

FIG. 7 is a diagram illustrating an example of the information to be stored in the past image storage portion 23. For example, the past image storage portion 23 stores, as illustrated in FIG. 7, an image file "000001.bmp" at the photographed time in association with the set color "red", set pattern "pattern A" and photographed time "00:00:00" in the display device 41. The term "past image" refers to an image photographed by the imaging device 40 at the state with an object and/or a human figure, for example, before the input image input by the object extracting apparatus 10 for the comparison in object extracting processing. The image may have any file format, without limiting to the bmp format.

The threshold value setting storage portion 24 stores the luminance differences in color between images. FIG. 8 is a diagram illustrating an example of the information to be stored in the threshold value setting storage portion 24. More specifically, the threshold value setting storage portion 24 stores, as illustrated in FIG. 8, a threshold value for the luminance difference representing the difference in degree of brightness between the "set color of the input image in the display device" and the "set color of the past image in the display device", which are the set colors of two images in the display device 41. For example, the threshold value setting storage portion 24 stores, as illustrated in FIG. 8, the threshold value "50" for the luminance difference between the set color "blue" of the input image in the display device 41 and the set color "red" of the past image in the display device 41.

As the hue is closer to "white" and brighter, the luminance of the image is higher. As the hue is closer to "black" and is darker, the hue of the image is lower. Therefore, two images having different colors have a difference in luminance. The threshold value setting storage portion 24 stores the minimum value of the difference in luminance on two images having different colors (that is, the value lower than the difference in luminance is ignored).

The control unit 30 has an internal memory for storing a control program, programs defining processing routines and necessary data and particularly has a display setting controlling portion 31, a display control portion 32, a photographing controlling portion 33 and an input image/past image comparing portion 36, whereby various processes are implemented.

If the luminance difference in set color in the display device 41 between an input image and a past image, which is photographed before the input image by the imaging device 40 and is a comparison target, is equal to or higher than a third predetermined value, the input image/past image comparing portion 36 determines that no objects exist. If it is lower than the third predetermined value, the input image/past image comparing portion 36 determines that some object exists.

In one concrete example, the input image/past image comparing portion 36 acquires a past image "000005.bmp" (in set color "white") stored in the past image storage portion 23 on the basis of the information such as the color "red" and pattern "pattern A" notified by the display setting controlling portion 31.

Then, the input image/past image comparing portion 36 calculates the luminance difference between the two images of the input image, which is photographed and input by the imaging device 40, and the acquired past image "000005.bmp", which is the comparison target. Next, the input image/past image comparing portion 36 acquires the threshold value "180" corresponding to the set color "red" of the input image in the display device 41 and the set color "white" of the past image in the display device 41 from the threshold value setting storage portion 24.

After that, if the calculated luminance difference is equal to or higher than the threshold value "180", the input image/past image comparing portion 36 determines that no objects exist. If it is lower than the threshold value "180", the input image/past image comparing portion 36 determines some object exists. Then, the input image/past image comparing portion 36 outputs the comparison result to an output apparatus such as a monitor and/or a system connecting thereto. Notably, the comparison result output by the input image/past image comparing portion 36 may be the presence or absence of an object and/or a human figure (which is binary value information), the form of an object or the size of an object.

The past image to be acquired by the input image/past image comparing portion 36 may be any past image having a different color from the information on the color and pattern notified by the display setting controlling portion 31. However, a combination of colors providing a higher threshold value to be stored in the threshold value setting storage portion 24 may allow the extraction of an object and/or a human figure with higher accuracy. For example, in order to increase the threshold value for each set color, a past image may be acquired which has "white" for the set color "red", "white" for the set color "blue", "black" for the set color "yellow" and "black" for the set color "white" (refer to FIG. 8).

Then, the input image/past image comparing portion 36 stores the input image, which is photographed and input by the imaging device 40, in association with the set color, set pattern and photographed time in the past image storage portion 23. Notably, plural past images may be used by the input image/past image comparing portion 36.

The input image/past image comparing portion 36 may perform the object extracting processing using pixel values, like Embodiment 1, instead of the object extracting processing using threshold values. More specifically, if the difference between the pixel values at the same position on the two images of an input image and a past image, which is photographed before the input image by the imaging device 40 and is a comparison target, is equal to or higher than a second predetermined value, the input image/past image comparing portion 36 determines that no objects exist. If it is lower than second predetermined value, the input image/past image comparing portion 36 determines and outputs that some object exists.

Comparison Result Output Processing According to Embodiment 2

Figure 9:
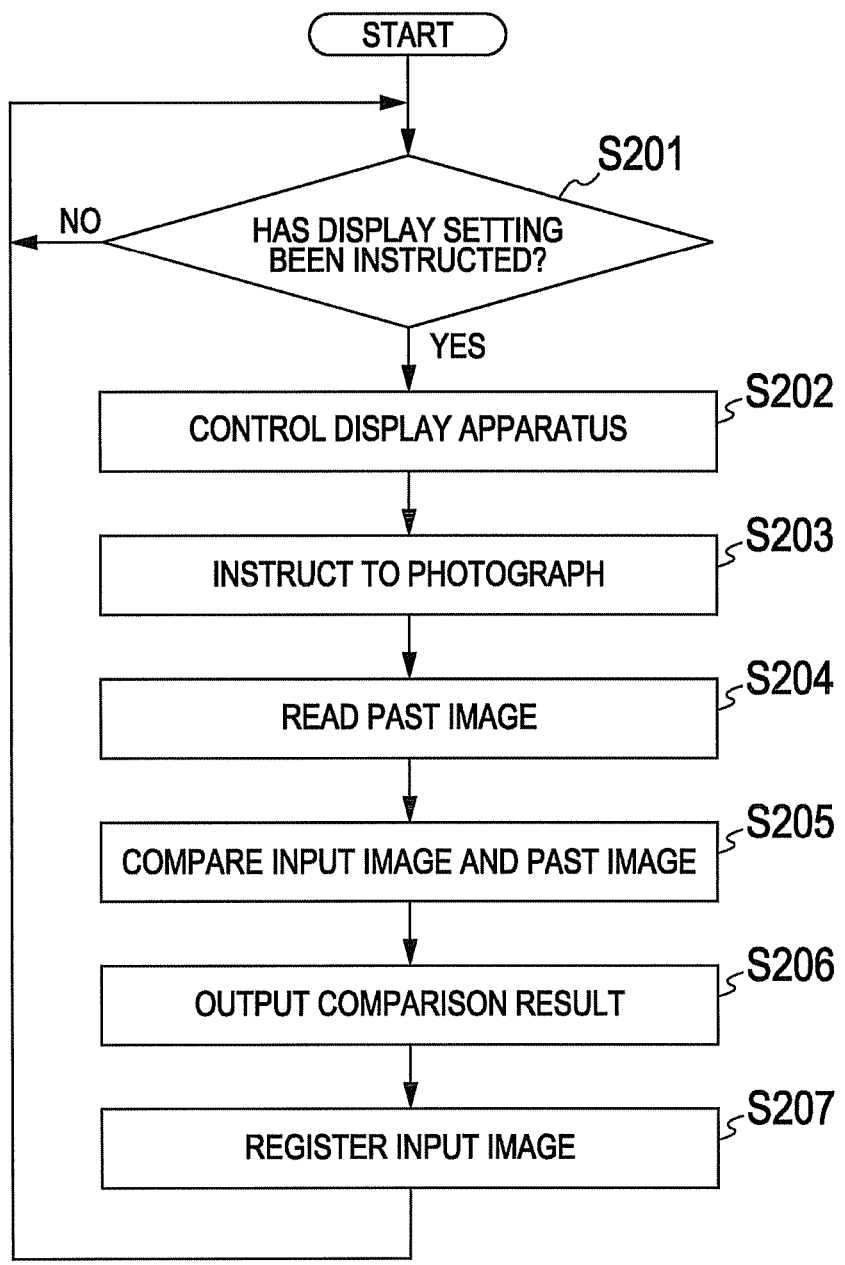
FIG. 9 is a flowchart for describing the flow of the comparison result output processing according to Embodiment 2.

Next, with reference to FIG. 9, the flow of the comparison result output processing according to Embodiment 2 will be described. FIG. 9 is a flowchart for describing the flow of the comparison result output processing according to Embodiment 2.

As illustrated in FIG. 9, for example, the display setting controlling portion 31 notifies the instruction to change the color "red" and pattern "pattern A" to be displayed and be output by the display device 41, which has a liquid crystal display or an LED luminescent panel, and the timing for the display and output to the display control portion 32 (YES in step S201).

The display setting controlling portion 31 notifies that the imaging device 40 is instructed to photograph in timing when the display device 41 is caused to display and output the image to the imaging controlling portion 33. The display setting controlling portion 31 notifies the information such as the color "red" and pattern "pattern A" to be instructed to change in the display device 41 to the input image/past image comparing portion 36.

Then, the display control portion 32 acquires the display control signal "001A" stored in the display control signal storage portion 21 on the basis of the information such as the color "red" and pattern "pattern A" notified by the display setting controlling portion 31 and notifies the acquired display control signal "001A" to the display device 41 (step S202).

Next, the photographing controlling portion 33 controls the imaging device 40 to photograph in synchronization with the timing when the display device 41 is caused to display and output the image (which is the timing when the image is changed and is displayed and is output) notified by the display setting controlling portion 31 (step S203).

After that, the input image/past image comparing portion 36 acquires the past image "000005.bmp" stored in the past image storage portion 23 on the basis of the information such as the color "red" and pattern "pattern A" notified by the display setting controlling portion 31 (step S204).

The input image/past image comparing portion 36 calculates the luminous difference between the two images of the input image, which is photographed and input by the imaging device 40, and the acquired past image "000005.bmp", which is a comparison target. Then, the input image/past image comparing portion 36 acquires the threshold value "180" corresponding to the set color "red" of the input image in the display device 41 and the set color "white" of the past image in the display device 41 from the threshold value setting storage portion 24.

After that, if the calculated luminance difference is equal to or higher than the threshold value "180", the input image/past image comparing portion 36 determines that no objects exist. If it is lower than the threshold value "180", the input image/past image comparing portion 36 determines some object exists (step S205). Then, the input image/past image comparing portion 36 outputs the comparison result to an output apparatus such as a monitor and/or a system connecting thereto (step S206).

Then, the input image/past image comparing portion 36 stores the input image, which is photographed and is input to the object extracting apparatus 10 by the imaging device 40, in association with the set color, set pattern and photographed time in the past image storage portion 23 (step S207).

Effects of Embodiment 2

As described above, the object extracting apparatus 10 changes the color and/or pattern to be displayed and be output by the display device 41 in a much shorter time, causes the imaging device 40 to photograph in timing when the display device 41 is caused to display and output, compares the luminances of the photographed input image and a past image to be compared, which has been photographed before the input image, and outputs the comparison result. Therefore, the object can be extracted with higher accuracy.

Because the object extracting apparatus 10 compares an input image and a past image having a larger luminance difference therefrom and outputs the comparison result, the time taken for the object extracting processing can be reduced more. Furthermore, the processing load on the object extracting apparatus 10 can be reduced.

Embodiment 3

Having described, according to Embodiment 1, the case where the input image 51 photographed by the imaging device 40 and a pre-photographed background image are compared and the comparison result is output, the present invention is not limited thereto. The input image, which is photographed by the imaging device 40, and the background image, which is created on the basis of the input image, may be compared, and the comparison result may be output.

According to Embodiment 3, with reference to FIG. 10 to FIG. 15, the processing by the object extracting apparatus 10 according to Embodiment 3 will be described below. Notably, because the components and partial functions of the object extracting apparatus 10 according to Embodiment 3 are similar to those of Embodiment 1 or Embodiment 2, the description thereon will be omitted herein. Particularly, a corresponding display number storage portion 25, a display setting controlling portion 31, a background image creating portion 37, an input image/background image comparing portion 35 (an extractor) and an object locating/tracking portion 38, which are different from Embodiment 1 or Embodiment 2, will be described.

Configuration of Object Extracting Apparatus According to Embodiment 3

Figure 10:
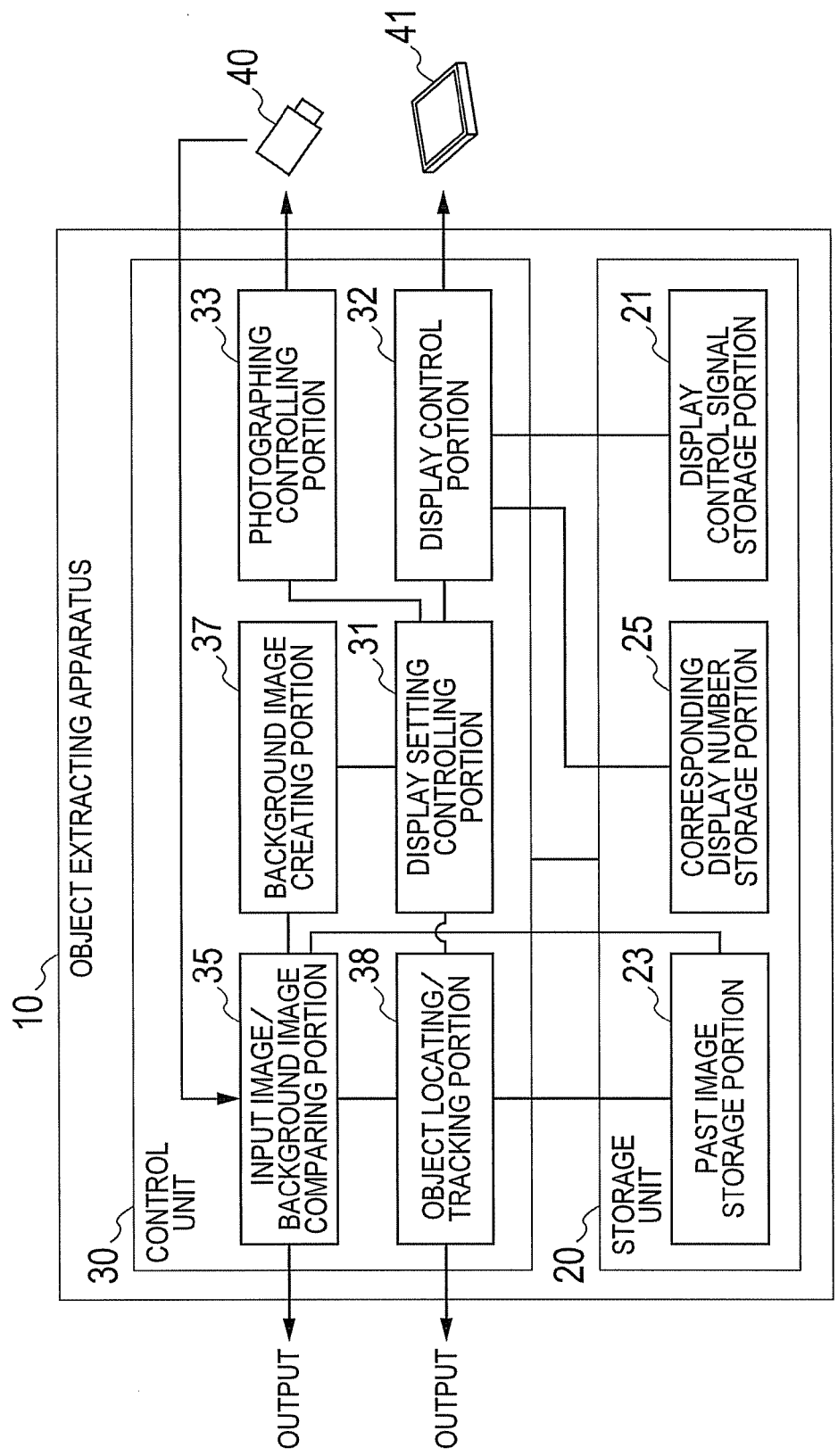
FIG. 10 is a diagram illustrating a configuration example of the object extracting apparatus 10 according to Embodiment 3.

First of all, with reference to FIG. 10, the configuration of the object extracting apparatus 10 according to Embodiment 3 will be described. FIG. 10 is a diagram illustrating a configuration example of the object extracting apparatus 10 according to Embodiment 3.

As illustrated in FIG. 10, the object extracting apparatus 10 includes a storage unit 20 and a control unit 30 and is connected to at least one imaging device 40, which is, for example, a surveillance camera that performs surveillance and photographs video within a surveillance range, and at least one display device 41, which performs display and output by changing the color and/or pattern to be displayed in accordance with the control signal.

The storage unit 20 stores data used by the processing by the control unit 30 and processing results by the control unit 30 and particularly has a display control signal storage portion 21 and a corresponding display number storage portion 25.

Figures 11, 12:
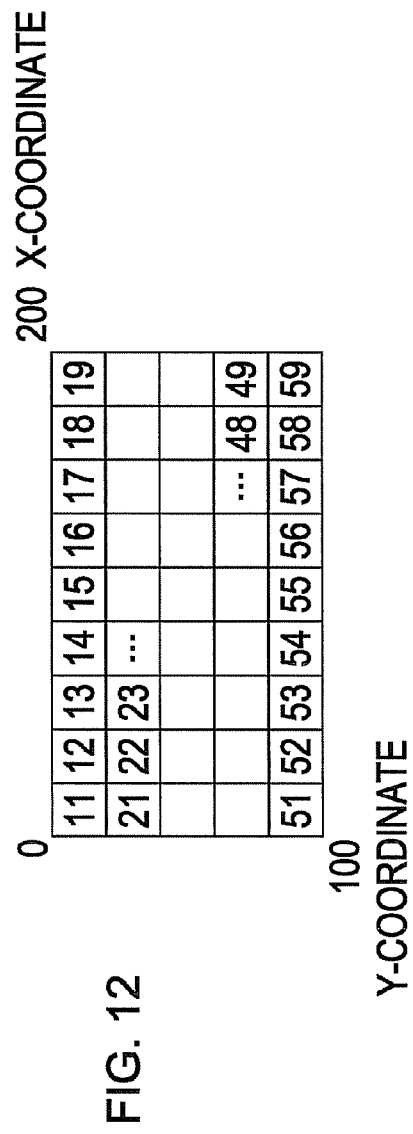
FIG. 11 is a diagram illustrating an example of the information to be stored in a corresponding display number storage portion.
FIG. 12 is a plan view for describing the number of the display surface of a display device.

The corresponding display number storage portion 25 stores the position of an object on an input image input to the object extracting apparatus 10 and the position number in the display device 41, which corresponds to the position of the object, in association. FIG. 11 is a diagram illustrating an example of the information to be stored in the corresponding display number storage portion 25. More specifically, the corresponding display number storage portion 25 stores the position coordinates "X-coordinate" and "Y-coordinate" of the object on the input image input to the object extracting apparatus 10 and the "number" given to the display surface of the display device 41 to be changed in color, which corresponds to the position coordinate of the object, in association, as illustrated in FIG. 11. FIG. 12 is a plan view for describing the numbers of the display surfaces of the display device. The position coordinates "X-coordinate" and "Y-coordinate" of an object correspond to the X-coordinate and Y-coordinate within the display surface.

For example, the corresponding display number storage portion 25 stores, as illustrated in FIG. 11, the X-coordinates "0 to 20" and Y-coordinates "0 to 20" of an object on an input image and the number "11" in (the display surface of) the display device to be changed in color, which correspond to the position coordinates of the object in association.

The control unit 30 has an internal memory for storing a control program, programs defining processing routines and necessary data and particularly has a display setting controlling portion 31, a display control portion 32, a photographing controlling portion 33, a background image creating portion 37, an input image/background image comparing portion 35, and an object locating/tracking portion 38, whereby various processes are implemented.

The display setting controlling portion 31 instructs the image to be displayed and be output to the display device on the basis of the position and color of the object detected by the object locating/tracking portion 38, which will be described later. In one concrete example, the display setting controlling portion 31 controls the display range and the image having the color and pattern on the basis of the position and color of the object detected by the object locating/tracking portion 38 to the display device.

Figure 13:
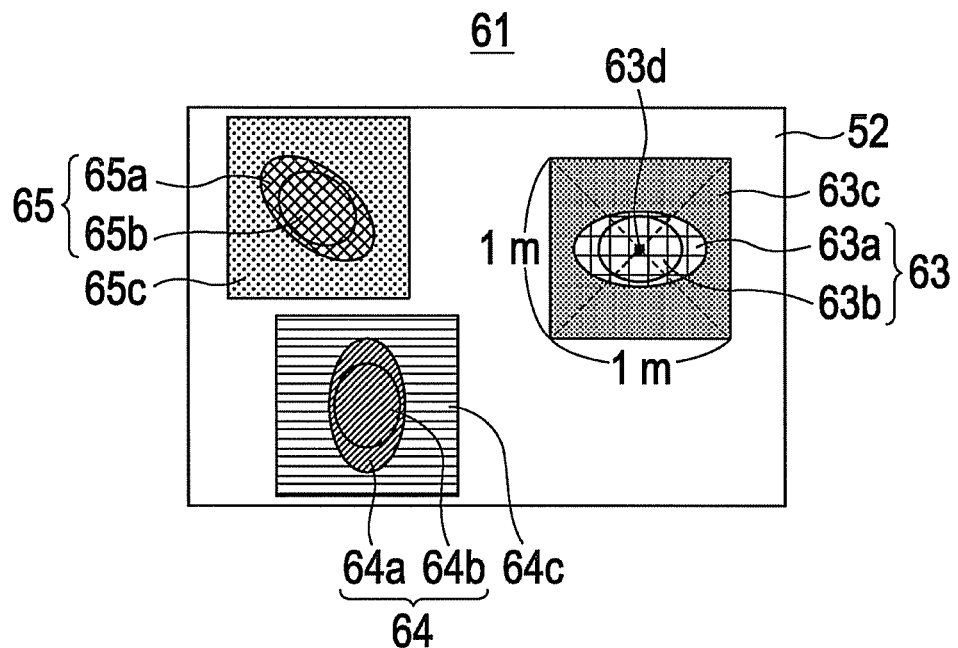
FIG. 13 is a diagram for describing an example in which a pattern within a square is changed according to Embodiment 3.

FIG. 13 is a plan view of an input image 61 of objects 63 to 65 and a display surface 52. The input image 61 is obtained by the imaging device 40. The object 63 includes parts 63a and 63b, the object 64 includes parts 64a and 64b, and the object 65 includes parts 65a and 65b. The objects 63, 64 and 65 have pixels having different colors, luminance values and shade values. The image to be displayed and be output on the display surface 52 of the display device 41 is changed by changing the pixel value (such as a pattern) of the display surface within the square about the center of the object or about the position of the foot of the human figure, which is received from the object locating/tracking portion 38. For example, as illustrated in FIG. 13, the pattern on the display surface 63c within the square of side 1 m about the center 63d of the object 63 is changed, the pattern on the display surface 64c within the square of side 1 m about the center 64d of the object 64 is changed, and the pattern on the display surface 65c within the square of side 1 m about the center 65d of the object 65 is changed.

Figure 14:
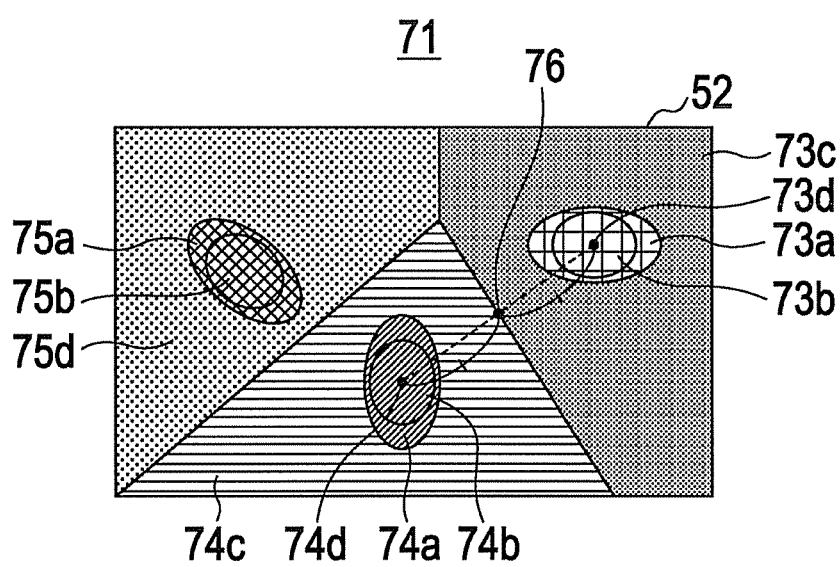
FIG. 14 is a diagram for describing an example using the midpoints of neighboring objects according to Embodiment 3.

FIG. 14 is a plan view illustrating an input image 71 of objects 73 to 75 and the display surface 52. The input image 71 is obtained by imaging device 40. FIG. 14 is a diagram for describing an example using the midpoints of neighboring objects according to Embodiment 3. The object 73 includes parts 73a and 73b, the object 74 includes parts 74a and 74b, and the object 75 includes parts 75a and 75b. The objects 73, 74 and 75 have pixels having different colors, luminance values and shade values. The image to be displayed and be output on the display surface 52 of the display device 41 may be divided, as illustrated in FIG. 14, for example, into a display 73c, which is closer to the object 73 and is output in a pixel value having a large difference from the pixel value of the object 73, a display 74c, which is closer to the object 74 and is output in a pixel value having a large difference from the pixel value of the object 74 and a display 75c, which is closer to the object 75 and is output in a pixel value having a large difference from the pixel value of the object 75 across the boundaries on the midpoint between neighboring two objects (such as the midpoint 76 between the object 73 and object 74) on the basis of the positions of all of the objects 73 to 75 received from the object locating/tracking portion 38.

The color to be changed may be acquired by, for example, changing the color of the display surface 52 to several colors in advance for each object and/or human figure, performing detecting processing thereon, and finding out the color that allows the easiest detection of the object and/or human figure. After that, the found color is used. Alternatively, the color to be changed may be acquired by, for example, checking the color within a predetermined range when no colors are changed on the display surface 52 and using the color not present within the predetermined range. Thus, the color can be used, which is surely different from that of the human figure or object within the predetermined range.

The display control portion 32 acquires the number of the display surface to cause to emit light from the X-coordinate and Y-coordinate of the position of an object or a human figure in accordance with the corresponding display number storage portion 25 in combination with the display instruction based on the control signal according to Embodiment 1 above and changes the color of the display surface (refer to FIG. 12) corresponding to the acquired number.

The background image creating portion 37 creates the background image to be compared on the basis of the image notified by the display setting controlling portion 31. In one concrete example of the example, the background image creating portion 37 creates the background image in consideration of the case where it is displayed and is output by the display device 41 on the basis of the information on the color, pattern and changed position notified by the display setting controlling portion 31.

The input image/background image comparing portion 35 compares the input image and the background image created by the background image creating portion 37 and outputs the comparison result. In one concrete example of the example, the input image/background image comparing portion 35 calculates the difference between the pixel values at the same position on the two images of the input image, which is photographed and is input by the imaging device 40, and the background image, which is created by the background image creating portion 37.

Then, if the calculated difference in pixel value is equal to or higher than a predetermined value, the input image/background image comparing portion 35 determines that some object exists. If it is lower than the predetermined value, the input image/background image comparing portion 35 determines that no objects exist. Then, the input image/background image comparing portion 35 outputs the comparison result to an output apparatus such as a monitor and/or a system connecting thereto. Notably, the background image according to Embodiment 3 is, unlike the background image according to Embodiment 1, an image in a color defined for easy extraction of an object or human figure thereon. Therefore, the processing time taken for the object extraction can be reduced.

The object locating/tracking portion 38 detects the position of an object on an input image and tracks the object. In one concrete example of the example, the object locating/tracking portion 38 may use the current input image and a past input image, for example, to perform locating processing and tracking processing on a human figure or an object. Notably, the method for tracking a human figure or an object, for example, may apply the back projection method that recognizes the position of a human figure by using plural cameras and a Kalman filter (Reference Document 1).

Reference Document 1: Mitsuharu HAYASAKA, Hideyoshi TOMINAGA and Kazumi KOMIYA, "Multiple Object Tracking Using Back Projection Method and Kalman Filter", IEICE Technical Report, PRMU 2001-132, pp. 133-138, November 2001.

Comparison Result Output Processing According to Embodiment 3

Figure 15:
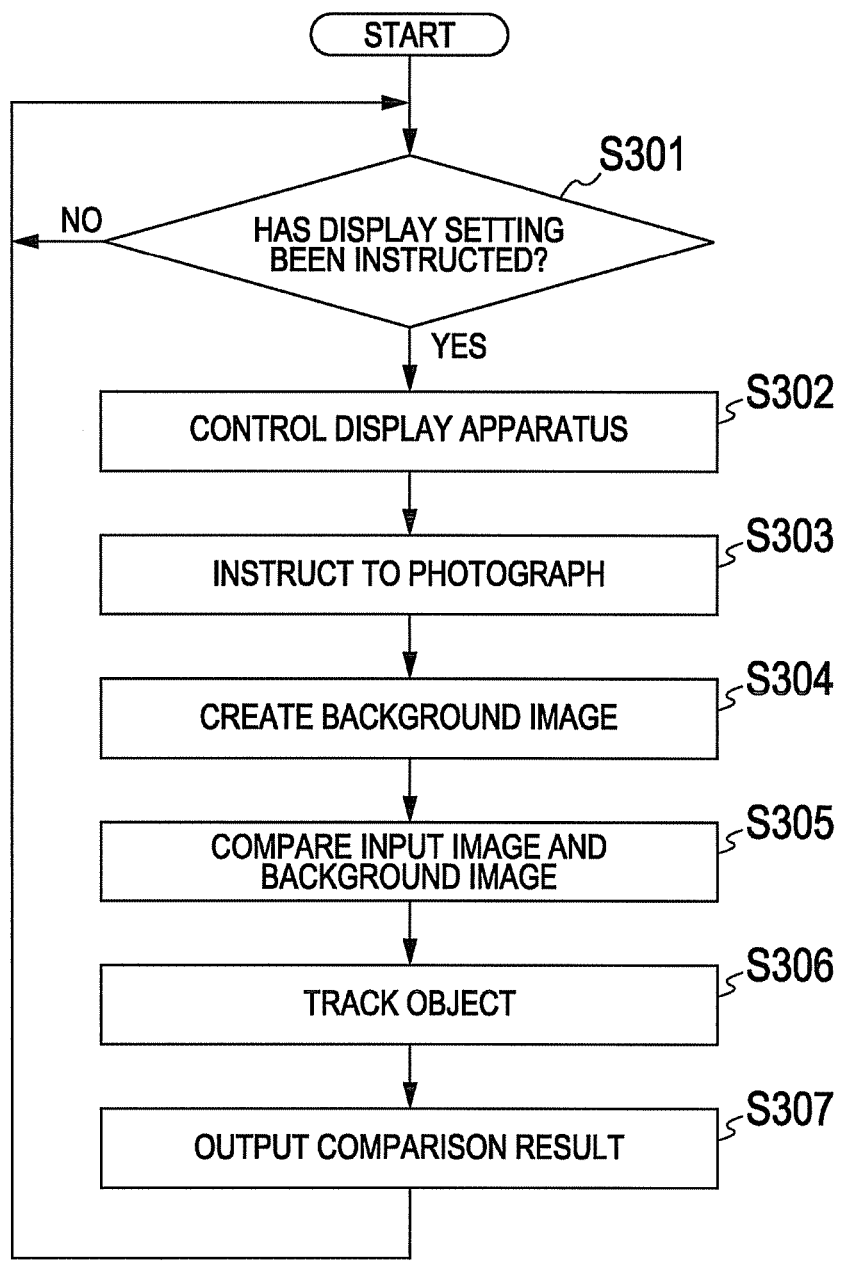
FIG. 15 is a flowchart for describing the flow of the comparison result output processing according to Embodiment 3.

Next, with reference to FIG. 15, the flow of the comparison result output processing according to Embodiment 3 will be described. FIG. 15 is a flowchart for describing the flow of the comparison result output processing according to Embodiment 3.

As illustrated in FIG. 15, for example, the display setting controlling portion 31 notifies the instruction to change the display range and the image of the color and pattern to be displayed and output and the timing for the display and output to the display control portion 32 on the basis of the position and color of the object detected by the object locating/tracking portion 38 (YES in step S301).

The display setting controlling portion 31 notifies that the imaging device 40 is caused to photograph in timing when the display device 41 is caused to display and output the image to the photographing controlling portion 33. The display setting controlling portion 31 further notifies the information on the display range, color and pattern in the display device 41 to be changed to the background image creating portion 37.

Then, the display control portion 32 notifies the display control signal stored in the display control signal storage portion 21 and the number stored in the corresponding display number storage portion 25 to the display device 41 on the basis of the information on the display range, color and pattern, for example, which is notified by the display setting controlling portion 31 (step S302).

Then, the photographing controlling portion 33 controls the imaging device 40 to photograph (step S303) in synchronization with the timing for displaying and outputting the image, which is notified by the display setting controlling portion 31, on the display device 41 (which is the timing for changing and displaying and outputting the image).

After that, the background image creating portion 37 creates a background image in consideration of the case where it is displayed and is output by the display device 41 on the basis of the information on the color, pattern and changed position, which is notified by the display setting controlling portion 31 (step S304).

Then, the input image/background image comparing portion 35 calculates the difference between the pixel values at the same position on the two images of the input image, which is photographed and is input by the imaging device 40, and the background image, which is created by the background image creating portion 37. Then, if the calculated difference in pixel value is equal to or higher than a predetermined value, the input image/background image comparing portion 35 determines that some object exists. If it is lower than the predetermined value, the input image/background image comparing portion 35 determines that no objects exist (step S305).

After that, the object locating/tracking portion 38 uses the current input image and a past input image, for example, to perform locating processing and tracking processing on a human figure or an object, for example (step S306). Then, the input image/background image comparing portion 35 and the object locating/tracking portion 38 output the comparison result and tracking result to an output apparatus such as a monitor and/or a system connecting thereto (step S307).

Effects of Embodiment 3

As described above, the object extracting apparatus 10 changes the color, pattern and display range to be displayed and be output by the display device 41 in accordance with the color of an object or a human figure, for example. Thus, even at the state where plural objects and/or human figures are present in the area under surveillance by the imaging device 40, all of the objects and/or human figures can be detected, without leaving out them even a moment.

Embodiment 4

Having described the embodiments of the present invention up to this point, the present invention may be implemented in various different forms excluding the embodiments above. Different embodiments in (1) configurations of the object extracting apparatus and (2) programs will be described below.

(1) Configurations of Object Extracting Apparatus

The information including the processing routines, control routines, specific names, data and parameters described herein and/or illustrated in the drawings (such as the information including the data and parameters to be stored in the background image storage portion 22 as illustrated in FIG. 2) may be changed arbitrarily unless otherwise indicated.

The components of the illustrated apparatus are only based on the functional concepts and are not always physically configured as illustrated in the drawings. In other words, the distribution and integration of the apparatus are not limited to the illustrated specific forms. For example, the display setting controlling portion 31, the display control portion 32 and the photographing controlling portion 33 may be integrated as a display/photographing controlling portion that notifies the instruction to cause the display device 41 to display and output, the control signal and the timing for the display and output and the instruction and timing to cause the imaging device 40 to photograph to the display device 41 and the imaging device 40, respectively. In this way, all or a part of them may be distributed or be integrated functionally or physically in arbitrary units in accordance with the loads and the status of use. All or an arbitrary part of the processing function to be performed in each apparatus may be implemented by a CPU and a program to be analyzed and be executed in the CPU or may be implemented as hardware with a wired logic system.

(2) Programs

Figure 16:
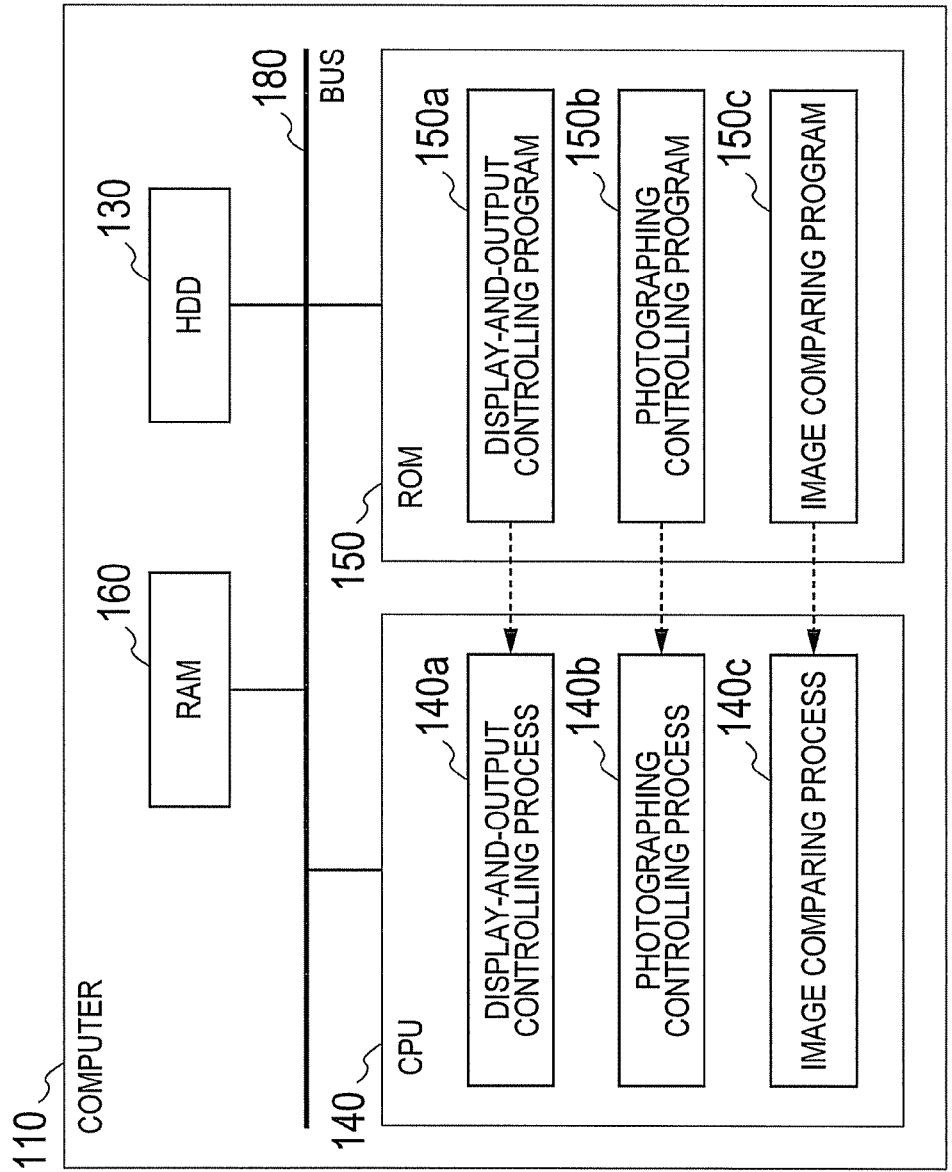
FIG. 16 is a diagram illustrating the computer that executes object extracting programs.
Figure 17:
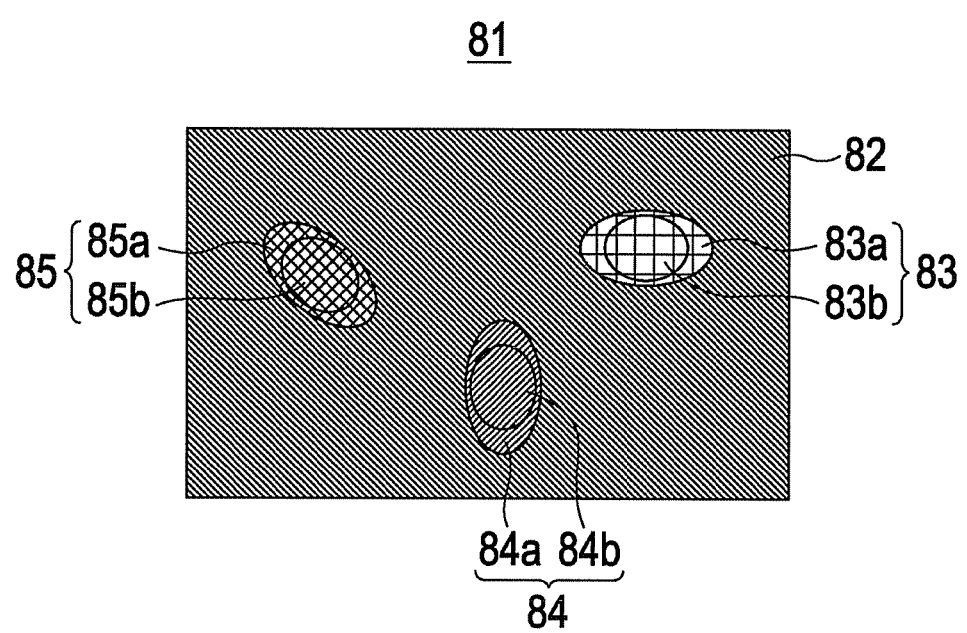

Having described, according to the embodiments, the case where the processing is implemented with the hardware logic system, the present invention is not limited thereto. It may be implemented by executing a program, which is prepared in advance, in a computer. With reference to FIG. 16, an example of the computer that executes an object extracting program having the same functions as those of the object extracting apparatus 10 according to the embodiments will be described below. FIG. 16 is a diagram illustrating the computer that executes the object extracting program.

As illustrated in FIG. 16, a computer 110 functioning as the object extracting apparatus is connected via a bus 180, for example, and has an HDD 130, a CPU 140, a ROM 150 and a RAM 160.

The ROM 150 prestores object extracting programs that deliver the same functions as those of the object extracting apparatus 10 according to Embodiment 1 above, that is, a display-and-output controlling program 150a, a photographing controlling program 150b, and an image comparing program 150c as illustrated in FIG. 16. Notably, the programs 150a to 150c may be integrated or be distributed properly in the same manner as that for the components of the object extracting apparatus 10 illustrated in FIG. 2.

Then, the CPU 140 reads and executes the programs 150a to 150c from the ROM 150, whereby, as illustrated in FIG. 16, the programs 150a to 150c can function as a display-and-output controlling process 140a, a photographing controlling process 140b and an image comparing process 140c. Notably, the processes 140a to 140c correspond to the display setting controlling portion 31, the display control portion 32, the photographing controlling portion 33 and the input image/background image comparing portion 35 illustrated in FIG. 2.

Then, the CPU 140 executes the object extracting program on the basis of the data recorded in the RAM 160.

Notably, the programs 150a to 150c are not always store in the ROM 150 from the beginning. For example, the programs may be stored in, for example, a flexible disk (FD), a CD-ROM, a DVD disk or a magneto-optical disk, which may be inserted to the computer 110, a "portable physical medium" such as an IC card, or a "fixed physical medium" such as an HDD, which may be provided inside or outside of the computer 110. Alternatively, the programs may be stored in a "different computer (or a server)" connecting to the computer 110 over a public network, the Internet, a LAN or a WAN, for example, and the computer 110 then may read and execute the programs.

The object extracting apparatus disclosed in the subject application can provide the effect that an object can be extracted with high accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus comprising:
    a display device having a display screen which emits light;
    an imaging device which takes an image of an object placed before the display screen and thereby generates input image data;
    a processor; and
    a memory which stores a plurality of instructions, which when executed by the processor, causes the processor to execute:
        controlling the display device to emit light and thereby changeably display predetermined images on the display screen,
        controlling the imaging device to take the image of the object in synchronization with the emission of light by the display screen to display a respective predetermined image of the predetermined images on the display screen, wherein the synchronization allows the imaging device to take the image via the emission of light by the display screen without emitting human visible photographic flash and allows a light emitting time of the display screen to be reduced by controlling the emission of light to be synchronized with the taking of the image, and
        extracting image data of the object by comparing the input image data generated by imaging device with data of the respective predetermined image displayed on the display screen, wherein
    the input image data and the data of the respective predetermined image respectively have a plurality of pixel values, and the instructions, when executed by the processor, cause the processor to execute:
        if a difference between a part of the pixel values of the input image data and a corresponding part of the pixel values of the respective predetermined image, the corresponding part of the pixel values indicating the object, is equal to or larger than a second predetermined value, determining and outputting that no object exists,
        if the difference is not equal to or larger than the second predetermined value, determining and outputting that the object exists,
    the pixel values are luminance values, and
    the predetermined image displayed on the display screen has a first combination of colors that is different than a second combination of colors of the respective input image data generated by the imaging device.

2. The apparatus according to claim 1, wherein the data of the respective predetermined image includes color data and pattern data.

3. The apparatus according to claim 1, wherein the input image data and the data of the respective predetermined image respectively have a plurality of pixel values, and the instructions, when executed by the processor, cause the processor to execute:
    if a difference between a part of the pixel values of the input image data and a corresponding part of the pixel values of the respective predetermined image is equal to or larger than a first predetermined value, determining and outputting that the object exists; and
    if the difference is not equal to or larger than the first predetermined value, determining and outputting that no object exists.

4. The apparatus according to claim 1, wherein the instructions, when executed by the processor, cause the processor to execute:
    generating the data of the respective predetermined image on the basis of the respective predetermined image displayed on the display screen,
    detecting a plurality of the input image data of the object,
    controlling the display device to display the respective predetermined image on the basis of the detected plurality of the input image data of the object, and extracting image data of the object by comparing the generated input image data with the generated data of the respective predetermined image.

5. The apparatus according to claim 4, wherein the instructions, when executed by the processor, causes the processor to execute:
controlling the display device to display the respective predetermined image having a display range, color and pattern generated on the basis of the detected plurality of the input image data of the object.

6. The apparatus according to claim 4, wherein the input image data and the data of the respective predetermined image respectively have a plurality of pixel values, and the instructions, when executed by the processor, cause the processor to execute:
if a difference between a part of the pixel values of the input image data and a corresponding part of the pixel values of the respective predetermined image is equal to or larger than a first predetermined value, determining and outputting that the object exists; and
if the difference is not equal to or larger than the first predetermined value, determining and outputting that no object exists.

7. A method comprising:
controlling a display screen to emit light and thereby changeably display predetermined images on the display screen;
taking an image of an object placed before the display screen in synchronization with the emission of light by the display screen to display a respective predetermined image of the predetermined images on the display screen and thereby generating input image data, wherein the synchronization allows said taking to take the image via the emission of light by the display screen without emitting human visible photographic flash and allows a light emitting time of the display screen to be reduced by controlling the emission of light to be synchronized with the taking of the image; and
extracting image data of the object by comparing the generated input image data with data of the respective predetermined image, wherein
the input image data and the data of the respective predetermined image respectively have a plurality of pixel values, and the instructions, when executed by the processor, cause the processor to execute:
if a difference between a part of the pixel values of the input image data and a corresponding part of the pixel values of the respective predetermined image, the corresponding part of the pixel values indicating the object, is equal to or larger than a second predetermined value, determining and outputting that no object exists,
if the difference is not equal to or larger than the second predetermined value, determining and outputting that the object exists,
the pixel values are luminance values, and
the predetermined image displayed on the display screen has a first combination of colors that is different than a second combination of colors of the respective input image data generated by the imaging device.

8. A non-transitory computer readable recording medium that stores therein a program that, when executed by a processor, causes the processor to execute:
controlling a display screen to emit light and thereby changeably display predetermined images on the display screen;
taking an image of an object placed before the display screen by an imaging device and thereby generating input image data by the imaging device;
controlling the imaging device to take the image of the object in synchronization with the emission of light by the display screen to display a respective predetermined image of the predetermined images on the display screen, wherein the synchronization allows the imaging device to take the image via the emission of light by the display screen without emitting human visible photographic flash and allows a light emitting time of the display screen to be reduced by controlling the emission of light to be synchronized with the taking of the image; and
extracting image data of the object by comparing the generated input image data with data of the respective predetermined image displayed on the display screen, wherein
the input image data and the data of the respective predetermined image respectively have a plurality of pixel values, and the instructions, when executed by the processor, cause the processor to execute:
if a difference between a part of the pixel values of the input image data and a corresponding part of the pixel values of the respective predetermined image, the corresponding part of the pixel values indicating the object, is equal to or larger than a second predetermined value, determining and outputting that no object exists,
if the difference is not equal to or larger than the second predetermined value, determining and outputting that the object exists,
the pixel values are luminance values, and
the predetermined image displayed on the display screen has a first combination of colors that is different than a second combination of colors of the respective input image data generated by the imaging device.

9. An apparatus comprising:
a display screen which emits light;
an imaging device;
a processor; and
a memory which stores a plurality of instructions that, when executed by the processor, causes the processor to execute:
controlling the display screen to emit light and thereby changeably display predetermined images on the display screen,
controlling the imaging device to take an image of an object placed before the display screen in synchronization with the emission of light by the display screen to display a respective predetermined image of the predetermined images on the display screen to thereby cause the imaging device to generate input image data, wherein the synchronization allows the imaging device to take the image via the emission of light by the display screen without emitting human visible photographic flash and allows a light emitting time of the display screen to be reduced by controlling the emission of light to be synchronized with the taking of the image, and
extracting image data of the object by comparing the input image data generated by imaging device with data of the respective predetermined image displayed on the display screen, wherein
the input image data and the data of the respective predetermined image respectively have a plurality of pixel values, and the instructions, when executed by the processor, cause the processor to execute:

if a difference between a part of the pixel values of the input image data and a corresponding part of the pixel values of the respective predetermined image, the corresponding part of the pixel values indicating the object, is equal to or larger than a second predetermined value, determining and outputting that no object exists, if the difference is not equal to or larger than the second predetermined value, determining and outputting that the object exists, the pixel values are luminance values, and the predetermined image displayed on the display screen has a first combination of colors that is different than a second combination of colors of the respective input image data generated by the imaging device.

10. The apparatus according to claim 1, wherein the instructions, when executed by the processor, further cause the processor to execute:
detecting the object before said controlling the imaging device,
wherein said controlling the imaging device controls the imaging device to take the image of the object in synchronization with the emission of light by the display screen to display, based on the detecting of the object by said detecting, a respective predetermined image of the predetermined images on the display screen.

11. The method according to claim 7, further comprising:
detecting the object before said taking,
wherein said taking takes the image of the object in synchronization with the emission of light by the display screen to display, based on the detecting of the object by said detecting, a respective predetermined image of the predetermined images on the display screen.

12. The non-transitory computer readable recording medium according to claim 8, wherein the program, when executed by the processor, further causes the processor to execute:
detecting the object before said controlling the imaging device,
wherein said controlling the imaging device controls the imaging device to take the image of the object in synchronization with the emission of light by the display screen to display, based on the detecting of the object by said detecting, a respective predetermined image of the predetermined images on the display screen.

13. The apparatus according to claim 9, wherein the instructions, when executed by the processor, further cause the processor to execute:
detecting the object before said controlling the imaging device,
wherein said controlling the imaging device controls the imaging device to take the image of the object in synchronization with the emission of light by the display screen to display, based on the detecting of the object by said detecting, a respective predetermined image of the predetermined images on the display screen.

14. The apparatus according to claim 1, wherein the instructions, when executed by the processor, further cause the processor to execute:
detecting at least one of position and color of the object before said controlling the imaging device,
wherein said controlling the imaging device controls the imaging device to take the image of the object in synchronization with the emission of light by the display screen to display, based on the detecting at least one of position and color of the object by said detecting, a respective predetermined image of the predetermined images on the display screen.

15. The method according to claim 7, further comprising:
detecting at least one of position and color of the object before said taking,
wherein said taking takes the image of the object in synchronization with the emission of light by the display screen to display, based on the detecting of the at least one of position and color of the object by said detecting, a respective predetermined image of the predetermined images on the display screen.

16. The non-transitory computer readable recording medium according to claim 8, wherein the program, when executed by the processor, further causes the processor to execute:
detecting at least one of position and color of the object before said controlling the imaging device,
wherein said controlling the imaging device controls the imaging device to take the image of the object in synchronization with the emission of light by the display screen to display, based on the detecting of the at least one of position and color of the object by said detecting, a respective predetermined image of the predetermined images on the display screen.

17. The apparatus according to claim 9, wherein the instructions, when executed by the processor, further cause the processor to execute:
detecting at least one of position and color of the object before said controlling the imaging device,
wherein said controlling the imaging device controls the imaging device to take the image of the object in synchronization with the emission of light by the display screen to display, based on the detecting of the at least one of position and color of the object by said detecting, a respective predetermined image of the predetermined images on the display screen.

18. The apparatus according to claim 1, wherein the instructions, when executed by the processor, further cause the processor to execute:
detecting the object before said controlling the imaging device,
wherein said controlling the imaging device controls the imaging device to take the image of the object in synchronization with the emission of light by the display screen to display, based on the detecting of the object by said detecting, a respective predetermined image of the predetermined images and a display range of the respective predetermined image on the display screen.

19. The method according to claim 7, further comprising:
detecting the object before said taking,
wherein said taking takes the image of the object in synchronization with the emission of light by the display screen to display, based on the detecting of the object by said detecting, a respective predetermined image of the predetermined images and a display range of the respective predetermined image on the display screen.

20. The non-transitory computer readable recording medium according to claim 8, wherein the program, when executed by the processor, further causes the processor to execute:
detecting the object before said controlling the imaging device,
wherein said controlling the imaging device controls the imaging device to take the image of the object in synchronization with the emission of light by the display screen to display a respective predetermined image of the predetermined images and a display range of the respective predetermined image on the display screen.

21. The apparatus according to claim 9, wherein the instructions, when executed by the processor, further cause the processor to execute:
   detecting the object before said controlling controls the imaging device,
   wherein said controlling the imaging device controls the imaging device to take the image of the object in synchronization with the emission of light by the display screen to display, based on the detecting of the object by said detecting, a respective predetermined image of the predetermined images and a display range of the respective predetermined image on the display screen.

* * * * *